United States Patent
Matsubara

(10) Patent No.: US 10,800,152 B2
(45) Date of Patent: Oct. 13, 2020

(54) DEVICE TO FABRICATE SOLID FREEFORM FABRICATION OBJECT, NON-TRANSITORY RECORDING MEDIUM, AND METHOD OF FABRICATING SOLID FREEFORM FABRICATION OBJECT

(71) Applicant: Kohta Matsubara, Kanagawa (JP)

(72) Inventor: Kohta Matsubara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 400 days.

(21) Appl. No.: 15/443,176

(22) Filed: Feb. 27, 2017

(65) Prior Publication Data

US 2017/0266880 A1 Sep. 21, 2017

(30) Foreign Application Priority Data

Mar. 16, 2016 (JP) .................................. 2016-052733

(51) Int. Cl.
*B29C 64/165* (2017.01)
*B29C 64/386* (2017.01)
(Continued)

(52) U.S. Cl.
CPC ............ *B33Y 10/00* (2014.12); *B29C 64/165* (2017.08); *B29C 64/386* (2017.08);
(Continued)

(58) Field of Classification Search
CPC ......... B33Y 30/00; B33Y 50/00; B33Y 50/02; B29C 64/386; B29C 64/393; B29C 64/165
See application file for complete search history.

(56) References Cited

U.S. PATENT DOCUMENTS

2014/0065194 A1* 3/2014 Yoo .......................... B29C 64/35
424/400
2015/0343533 A1* 12/2015 Park ........................ B28B 7/465
425/78

(Continued)

FOREIGN PATENT DOCUMENTS

JP 2005-138463 6/2005
JP 2009-034859 2/2009

(Continued)

*Primary Examiner* — Timothy Kennedy
*Assistant Examiner* — Farah Taufiq
(74) *Attorney, Agent, or Firm* — Harness, Dickey & Pierce, P.L.C.

(57) ABSTRACT

A device to fabricate a solid freeform fabrication object includes a flattening device to lay powder to form a powder layer and flatten a surface of the powder layer, a liquid fabrication application device to apply a liquid fabrication to the powder layer to fabricate a layer object, a fabrication controller to control fabrication of the solid freeform fabrication object by repeating laying the powder to form a powder layer, flattening the surface of the powder layer, and applying the liquid fabrication to the powder layer to laminate the layer object to fabricate the solid freeform fabrication object, and a detector to detect humidity. The fabrication controller changes at least one of the moving speed of the flattening device, the number of rotation of the flattening device, the application amount of the liquid fabrication, and the lamination pitch according to the humidity detected by the detector.

7 Claims, 8 Drawing Sheets

(51) Int. Cl.
*B29C 64/393* (2017.01)
*B33Y 10/00* (2015.01)
*B33Y 30/00* (2015.01)
*B33Y 50/02* (2015.01)
*B29K 105/00* (2006.01)

(52) U.S. Cl.
CPC .... *B29C 64/393* (2017.08); *B29K 2105/0058* (2013.01); *B29K 2105/251* (2013.01); *B33Y 30/00* (2014.12); *B33Y 50/02* (2014.12)

(56) References Cited

U.S. PATENT DOCUMENTS

2016/0368212 A1 12/2016 Matsubara et al.
2017/0095979 A1* 4/2017 Sasaki .................... B33Y 30/00

FOREIGN PATENT DOCUMENTS

| JP | 2011-126127 | | 6/2011 |
| JP | 2011126127 A | * | 6/2011 |
| JP | 2015-217538 A | | 12/2015 |
| JP | 2015-217587 | | 12/2015 |
| JP | 2015-227021 | | 12/2015 |
| JP | 2017-119350 A | | 7/2017 |

* cited by examiner

DEVICE TO FABRICATE SOLID FREEFORM FABRICATION OBJECT, NON-TRANSITORY RECORDING MEDIUM, AND METHOD OF FABRICATING SOLID FREEFORM FABRICATION OBJECT

CROSS-REFERENCE TO RELATED APPLICATIONS

This patent application is based on and claims priority pursuant to 35 U.S.C. § 119 to Japanese Patent Application No. 2016-052733 filed on Mar. 16, 2016, in the Japan Patent Office, the entire disclosure of which is hereby incorporated by reference herein.

BACKGROUND

Technical Field

The present invention relates to a device to fabricate solid freeform fabrication object, a non-transitory recording medium, and a method of fabricating solid freeform fabrication object.

Background Art

Solid objects (three-dimensional objects) can be manufactured by, for example, a device utilizing powder additive manufacturing. For example, such a device lays powder on a fabrication stage, flattens the powder to form a flattened powder layer, and applies a liquid fabrication to the flattened powder layer to bond the powder to form a layer object (referred to as fabrication layer) in which the powder is bonded. Thereafter, another powder layer is formed on the fabrication layer to form another fabrication layer, which is repeated until a solid freeform fabrication object is fabricated.

In such lamination fabrication in which powder is bonded by a liquid fabrication, the powder to be used is affected by humidity, which has an impact on permeability of the liquid fabrication and flowability of the particulate powder when the liquid fabrication is applied to the powder. This leads to a problem that the quality of fabrication is not stable.

SUMMARY

According to the present invention, provided is an improved device to fabricate a solid freeform fabrication object including a flattening device to lay powder to form a powder layer and flatten a surface of the powder layer, a liquid fabrication application device to apply a liquid fabrication to the powder layer to fabricate a layer object, a fabrication controller to control fabrication of the solid freeform fabrication object by repeating laying the powder to form a powder layer, flattening the surface of the powder layer, and applying the liquid fabrication to the powder layer to laminate the layer object to fabricate the solid freeform fabrication object, and a detector to detect humidity. The fabrication controller changes at least one of the moving speed of the flattening device, the number of rotation of the flattening device, the application amount of the liquid fabrication, and the lamination pitch according to the humidity detected by the detector.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
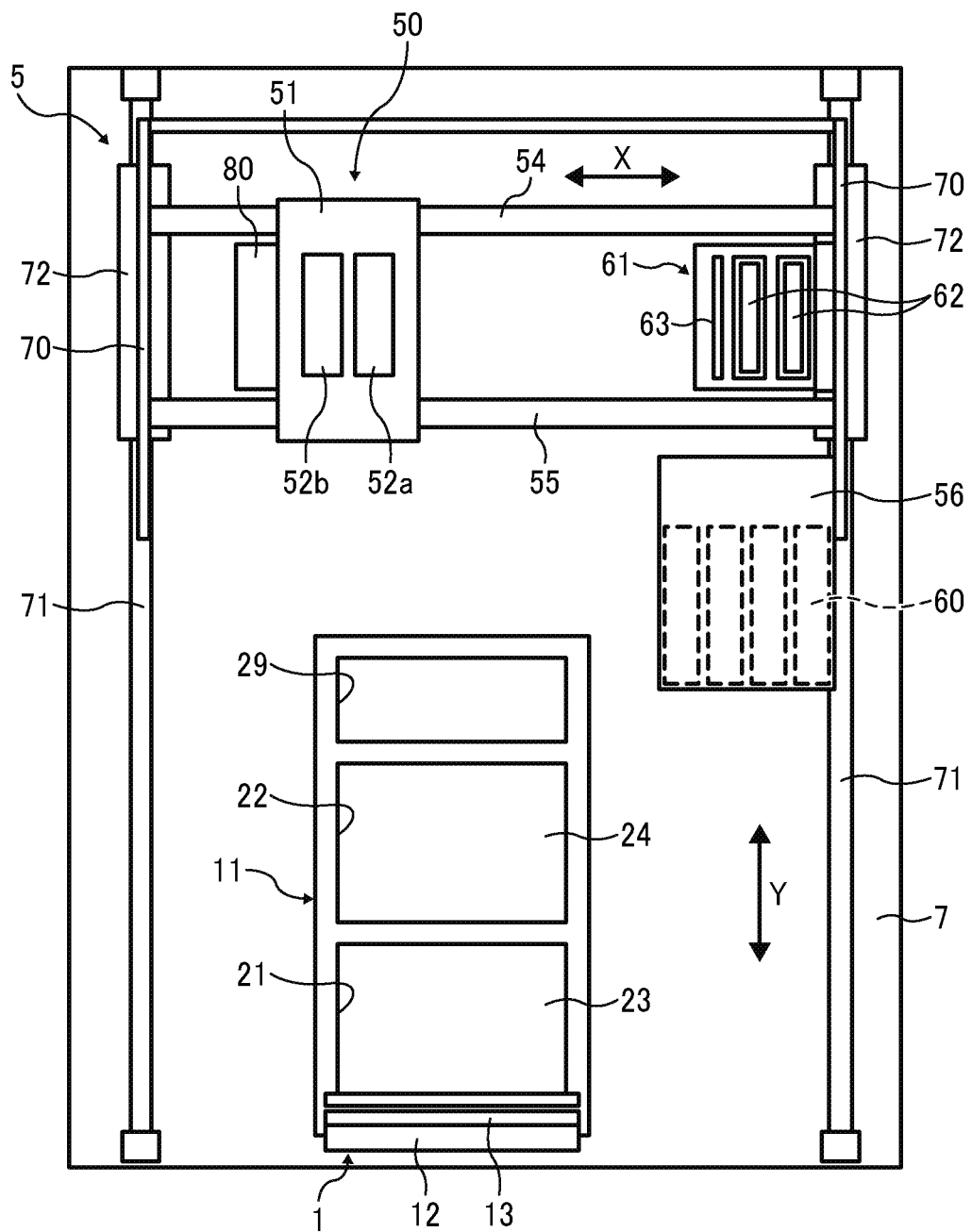
FIG. 1 is a diagram illustrating a planar view of the device according to an embodiment of the present disclosure.

The accompanying drawings are intended to depict exemplary embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

According to the present disclosure, quality of fabrication is stabilized.

Figure 2:
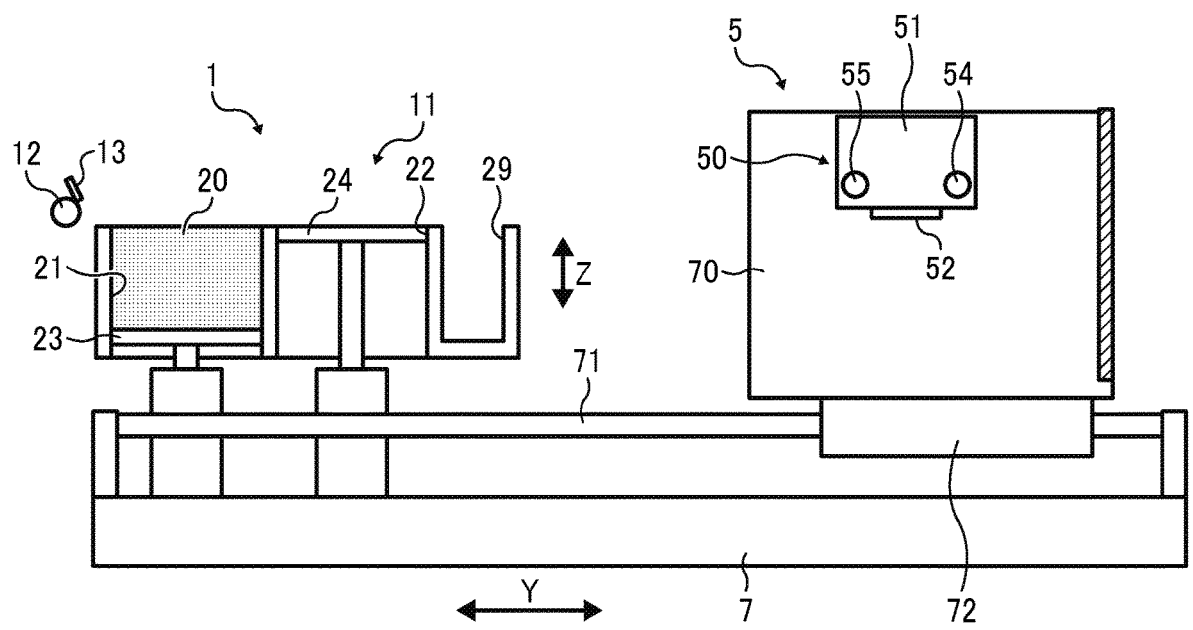
FIG. 2 is a diagram illustrating a side view of the device illustrated in FIG. 1.
Figure 3:
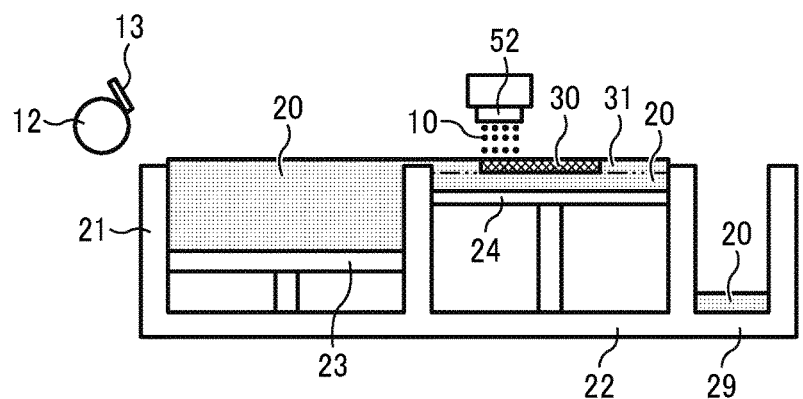
FIG. 3 is a diagram illustrating a cross section of the fabrication unit of the device illustrated in FIG. 1.

Embodiments of the present disclosure are described with reference to the accompanying drawings. An example of the device relating to an embodiment of the present disclosure will be described with reference to FIG. 1 to FIG. 3. FIG. 1 is a diagram illustrating a schematic planar view of the device, FIG. 2 is a diagram illustrating a schematic side view of the device, and FIG. 3 is a diagram illustrating a cross section of the fabrication unit of the device. The device illustrated in FIG. 3 is in the middle of fabricating a solid freeform fabrication object.

The device (solid freeform fabrication device) to fabricate a solid freeform fabrication object is a powder additive manufacturing device and includes a fabrication portion 1 where a fabrication layer 30 is formed as a layer object in which powder is bonded and a fabrication unit 5 to discharge and apply a liquid fabrication 10 to a powder layer 31 laid in a layer manner in the fabrication member 1 to form the fabrication layer 30.

The fabrication portion 1 includes a powder tank 11, a flattening roller 12 as a rotation body serving as a flattening member (recoater), etc. The flattening member can take, for example, a member having a plate-like form instead of the rotation body.

The powder tank 11 includes a supply tank 21 to hold a powder 20, a fabrication tank 22 to which the powder 20 is supplied and in which a solid freeform fabrication object is formed by laminating the fabrication layer 30, and a residual powder receiving tank 29 to store the residual powder 20 which has dropped without forming the powder layer 31 of the powder 20 conveyed and supplied by the flattening roller 12 when forming the powder layer 31.

The base of a supplying tank 21 freely lifts up and down in the vertical direction (height direction) as a supply stage 23. Similarly, the base of a fabrication tank 22 freely lifts up and down in the vertical direction (height direction) as a fabrication stage 24. On the fabrication stage 24, a solid freeform fabrication object is fabricated in which the fabrication layer 30 is laminated. The base of the residual powder receiving tank 29 includes a mechanism to suction the powder 20 and a configuration from which the residual powder receiving tank 29 is easily removed.

The supply stage 23 is elevated up and down in the direction indicated by an arrow Z (height direction) by a motor 27 and the fabrication stage 24 is similarly elevated up and down in the direction indicated by the arrow Z by a motor 28.

The flattening roller 12 conveys and supplies the powder 20 supplied onto the supply stage 23 of the supply tank 21 to the fabrication tank 22 and flattens (planarizes) the surface of the layer of the supplied powder by the flattening roller 12 serving as a flattening device to form the powder layer 31.

This flattening roller 12 is disposed to reciprocate along a direction Y indicated by the arrow relative to the stage surface (on which the powder 20 is held) of the fabrication stage 24 and moved by a reciprocating mechanism. In addition, the flattening roller 12 is rotationarily driven by a motor 26.

The fabrication unit 5 includes a liquid discharging unit 50 to discharge the liquid fabrication 10 to the powder layer 31 on the fabrication stage 24.

The liquid discharging unit 50 includes a carriage 51 and two liquid discharging heads (hereinafter referred to as head) 52a and 53b serving as the liquid fabrication application device carried by the carriage 51. The number of the heads is not limited two but can be one or three or more.

The carriage 51 is carried by guiding members 54 and 55. The guiding members 54 and 55 are held by side plates 70 on both sides to be movable up and down.

This carriage 51 is reciprocated in a direction X indicated by the arrow (hereinafter referred to as X direction as well as Y direction and Z direction) by an X direction scanning motor constituting an X direction scanning mechanism 550 via a pully and a belt.

These two heads 52a and 52b (hereinafter referred to as head 52 when not necessary to be distinguished) each include two nozzle lines including multiple nozzles through which the liquid fabrication is discharged. The two nozzle lines of the head 52a discharge cyan liquid fabrication and magenta liquid fabrication. The two nozzle lines of the head 52b discharge yellow liquid fabrication and black liquid fabrication. The head configuration is not limited thereto.

Multiple tanks 60 accommodating each liquid of the cyan liquid fabrication, magenta liquid fabrication, yellow liquid fabrication, and black liquid fabrication are mounted onto a tank mounting portion 56 to supply the liquid fabrications to the heads 52a and 52b via a supply tube, etc.

In addition, on one side of the X direction, a maintenance mechanism 61 is disposed to maintain and restore the head 52 of the liquid discharging unit 50.

The maintenance mechanism 61 is mainly constituted of a cap 62 and a wiper 63. The cap is caused to adhere to the nozzle surface (on which the nozzle is formed) in order to suction the liquid fabrication from the nozzle. This is to eject powder clogged in the nozzle and highly-thickened liquid fabrication. Thereafter, due to the meniscus forming (negative pressure in the nozzle) of the nozzle, the nozzle surface is wiped by the wiper 63. In addition, when the liquid fabrication is not discharged, the maintenance mechanism 61 covers the nozzle surface with the cap 62 to prevent contamination of the powder 20 into the nozzle or drying of the liquid fabrication.

The fabrication unit 5 includes a slider portion 72 held movable by the guiding member 71 disposed on a base member 7 and the entire fabrication unit 5 can reciprocate in the Y direction (sub-scanning direction) perpendicular to the X direction. This fabrication unit 5 is reciprocated in the Y direction by a Y direction scanning mechanism 552.

The liquid discharging unit 50 is disposed movable up and down in the Z direction together with the guiding members 54 and 55 and in the Z direction by a Z-direction elevating mechanism 551.

The detail of the fabrication portion 1 is described in detail.

The powder storage tank 11 has a box-like form and includes a supply tank 21, the fabrication tank 22, and the residual powder receiving tank 29 with each of the upper faces open. The supply stage 23 and the fabrication stage 24 are respectively disposed movable up and down inside the supply tank 21 and the fabrication tank 22.

The side of the supply stage 23 is disposed to abut on the inner surface of the supply tank 21. The side of the fabrication stage 24 is disposed to abut on the inner surface of the fabrication tank 22. The upper surfaces of the supply stage 23 and the fabrication stage 24 are held to be horizontal.

The residual powder receiving tank 29 to receive residual powder to be ejected to the outside of the fabrication tank 22 is disposed adjacent to the fabrication tank 22. The residual powder receiving tank 29 has a funnel-like form and includes an outlet at the base through which the powder 20 is ejected.

Of the powder 20 conveyed and supplied to the flattening roller 12 when forming the powder layer 31, residual powder drops into the residual powder receiving tank 29. The residual powder 20 dropped into the residual powder receiving tank 29 is returned to the powder supply device 554 which supplies the powder 20 to the supply tank 21 via, for example, powder retrieving and recycling device.

The powder supply device 554 is disposed on the supply tank 21. When the amount of the powder 20 in the supply tank 21 decreases or at the time of starting fabrication, the powder in the tank constituting the powder supply device 554 is supplied to the supplying tank 21. As the method of conveying powder to supply the powder, for example, a screw conveyor method using a screw and an air transfer method using air are suitable.

The flattening roller 12 conveys and supplies the powder 20 from the supply tank 21 to the fabrication tank 22 and flattens the surface of the layer of the powder 20 to form the powder layer 31 with a predetermined thickness.

This flattening roller 12 is a member having a bar form longer than the inside dimension (i.e., width of the portion where the power is supplied or placed) of the fabrication tank 22 and the supply tank 21 and reciprocates in the Y direction (sub-scanning direction) along the stage surface by the reciprocating mechanism.

The flattening roller 12 moves in the horizontal direction to pass above the tanks from the outside of the supply tank 21 to the supply tank 21 and the fabrication tank 22 while being rotated by the motor of the reciprocating mechanism. The powder 20 is conveyed and supplied onto the fabrication tank 22 and flattened by the flattening roller 12 while the flattening roller 12 passes thereon to form the powder layer 31.

As illustrated in FIG. 2, a powder removing plate 13 serving as a powder removing member to remove the powder 20 attached to the flattening roller 12 is disposed abutting on the periphery of the flattening roller 12.

The powder removing plate 13 moves together with the flattening roller 12 while in contact with the periphery of the flattening roller 12. In addition, the powder removing plate 13 can be disposed in the forwarding or backward (counter) direction to the rotation direction of the flattening roller 12 flattening the powder layer.

Figure 4:
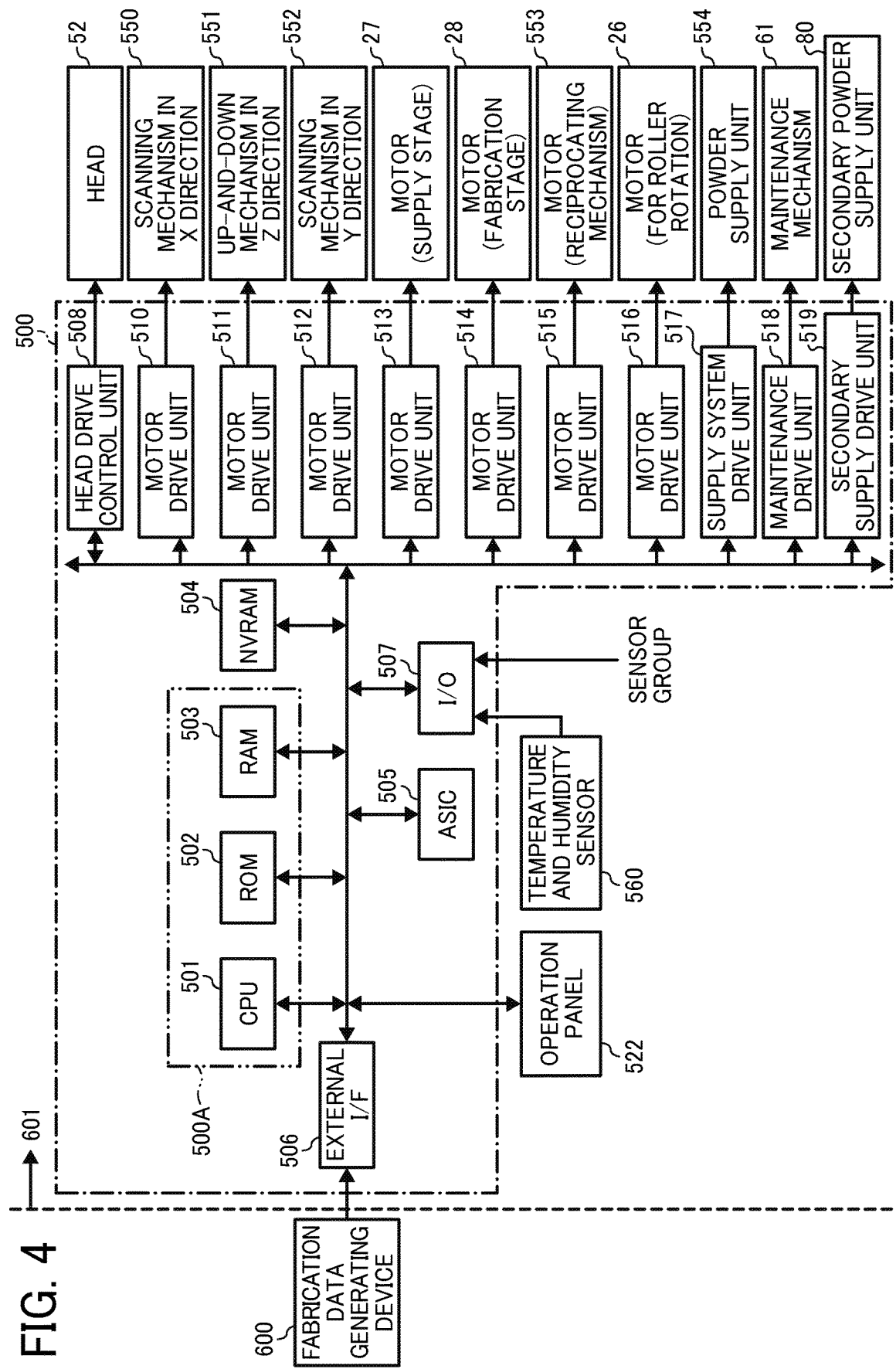
FIG. 4 is a block diagram illustrating the description of the controller of the device illustrate din FIG. 1.

Next, the control unit of the solid freeform fabrication device is described with reference to FIG. 4. FIG. 4 is a block diagram illustrating the control unit.

The control unit 500 includes a main control unit 500A including a CPU 501 taking a control of the entire device, a read-only memory (ROM) 502 that stores programs to execute control of the fabrication instructions executed by the central processing unit (CPU) 501 and other fixed data, and a random access memory (RAM) 503 that temporarily stores fabrication (modeling) data, etc.

The control unit 500 includes a non-volatile random access memory (NVRAM) 504 to hold data while the power of the device is blocked off. In addition, the control unit 500 includes an application specific integrated circuit (ASIC) 505 to conduct image processing for various signal processing for image data and process input and output signals to control the entire device.

The control unit 500 includes an interface (I/F) 506 to send and receive data and signals to be used when receiving fabrication data from an external fabrication data generating device 600.

The fabrication data generating device 600 generates fabrication data to fabricate a solid freeform fabrication object, which is sliced data obtained by slicing a target solid object into respective fabrication layers. The fabrication data generating device 600 includes a data processing device such as a home computer.

The control unit 500 includes an input-output (I/O) 507 to take in the detected signals of sensors.

The control unit 500 includes a head drive control unit 508 to drive and control the head 52 of the liquid discharging unit 50.

The control unit 500 includes a motor drive unit 510 to drive motors constituting the X direction scanning mechanism 550 to move the carriage 51 of the liquid discharging unit 50 in the X direction (main scanning direction) and a motor drive unit 512 to drive motors constituting the Y direction scanning mechanism to move the fabrication unit 5 in the Y direction (sub-scanning direction).

The control unit 500 includes a motor drive unit 511 to drive motors constituting the Z direction elevating mechanism 551 to move (elevate) up and down the carriage 51 of the liquid discharging unit 50 in the Z direction.

The elevation in the Z direction may be conducted by a configuration to elevate the entire of the fabrication unit 5.

The control unit 500 includes a motor drive unit 513 to drive the motor 27 to move up and down the supply stage 23 and a motor drive unit 514 to drive the motor 28 to move up and down the fabrication stage 24.

The control unit 500 includes a motor drive unit 515 to drive a motor 553 of the reciprocating mechanism to move the flattening roller 12 and a motor drive unit 516 to drive the motor 26 to rotationarily drive the flattening roller 12.

The control unit 500 includes a supply-system drive unit 517 to drive a powder supply device 554 to supply the powder 20 to the supply tank 21 and a maintenance drive unit 518 to drive a maintenance mechanism 61 of the liquid discharging unit 50.

The control unit 500 includes a second supply drive unit 519 to cause a second powder supply unit 80 to supply the powder 20.

Detected signals of a temperature and humidity sensor 560 to detect the temperature and the humidity as the environment condition of the device and detected signals from other sensors are input into the I/O 507 of the control unit 500.

In addition, the control unit 500 is connected with an operation panel 522 to input and display information required for the device.

As described above, the control unit 500 receives the fabrication data from the fabrication data generating device 600. The fabrication data includes forming data (fabrication data) of each fabrication layer 30 as the slice data obtained by slicing the form of the target solid object.

The main control unit 500A takes a control of discharging the liquid fabrication from the head 52 based on the fabrication data of the fabrication tank 30.

The fabrication device includes the fabrication data generating device 600 and a solid freeform fabrication device (powder additive manufacturing device) 601.

Next, the flow of the fabrication is described with reference to FIG. 5. FIG. 5 is a schematic diagram illustrating the flow of the fabrication.

In FIG. 5, the first fabrication layer 30 is formed on the fabrication stage 24 of the fabrication tank 22.

Figure 5A:
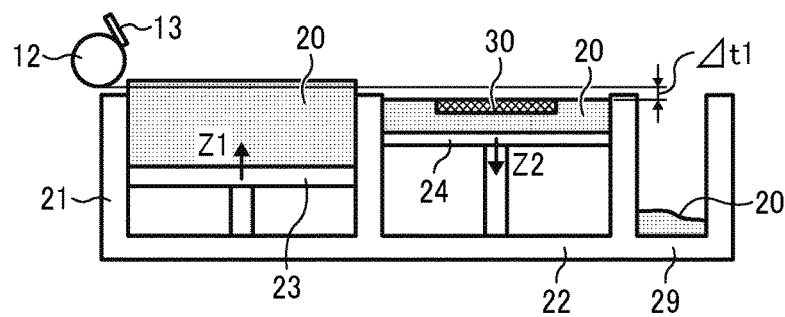
FIGS. 5A to 5E are schematic diagrams illustrating the flow of fabrication.

When forming the next fabrication layer 30 on the first fabrication layer 30, as illustrated in FIG. 5A, the supply stage 23 of the supply tank 21 is elevated up in a Z1 direction and the fabrication stage 24 of the fabrication tank 22 is elevated down in a Z2 direction.

The elevated-down distance of the fabrication stage 24 is determined in such a manner that the distance (lamination pitch) between the upper surface of the surface (powder surface) of the powder layer 31 of the fabrication tank 22 and the bottom part (bottom tangent portion) of the flattening roller 12 is $\Delta t1$. This distance $\Delta t1$ corresponds to the thickness (lamination pitch) of the powder layer 31 to be formed next. This distance Δt1 is preferably about several tens μm to several hundreds μm.

In this case, the flattening roller 12 is disposed with a gap to the upper surfaces of the supply tank 21 and the fabrication tank 22. Therefore, when the powder 20 is conveyed and supplied to the fabrication tank 22 for flattening, the surface (powder surface) of the powder layer 31 situated at a position higher than the upper surface of the supply tank 21 and the fabrication tank 22.

For this reason, the flattening roller 12 is securely prevented from contacting the upper surface of the supply tank 21 and the fabrication tank 22, thereby reducing damage to the flattening roller 12. When the surface of the flattening roller 12 is damaged, streaks occurs to the surface of the powder layer 31 so that the flatness thereof deteriorates.

Figure 5B:
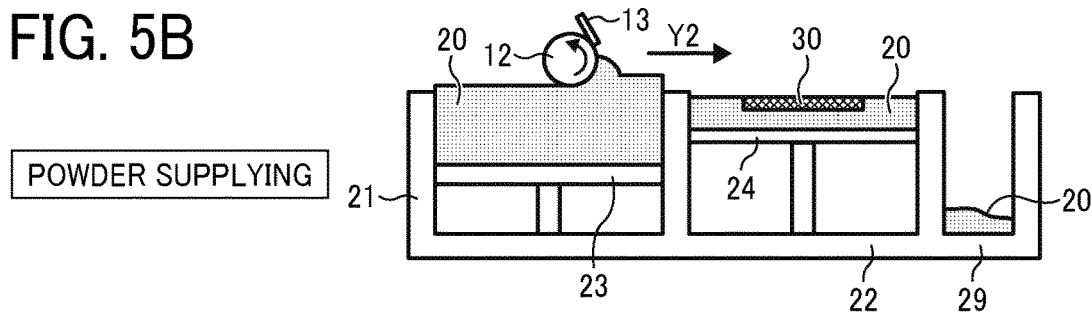

Thereafter, as illustrated in FIG. 5B, the powder 20 positioned above the upper surface level of the supply tank 21 is moved to a Y2 direction (toward the fabrication tank 22) while causing the flattening roller 12 to rotate in the reverse direction indicated by the arrow so that the powder 20 is conveyed and supplied to the fabrication tank 22 (powder supply).

Figure 5C:
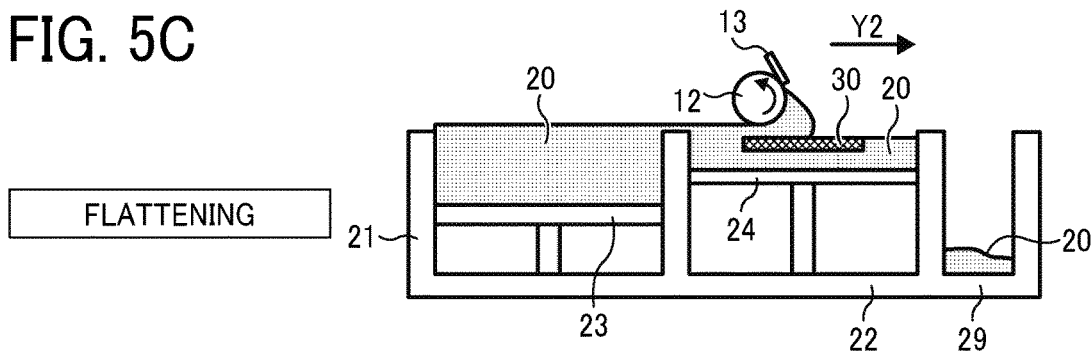

Moreover, as illustrated in FIG. 5C, the flattening roller 12 is moved in parallel to the stage surface of the fabrication stage 24 of the fabrication tank 22 to form the powder layer 31 having a predetermined thickness of Δt1 on the fabrication layer 30 of the fabrication stage 24. At this point, the residual powder 20, which has not been used to form the powder layer 31, drops to the residual powder receiving tank 29.

Figure 5D:
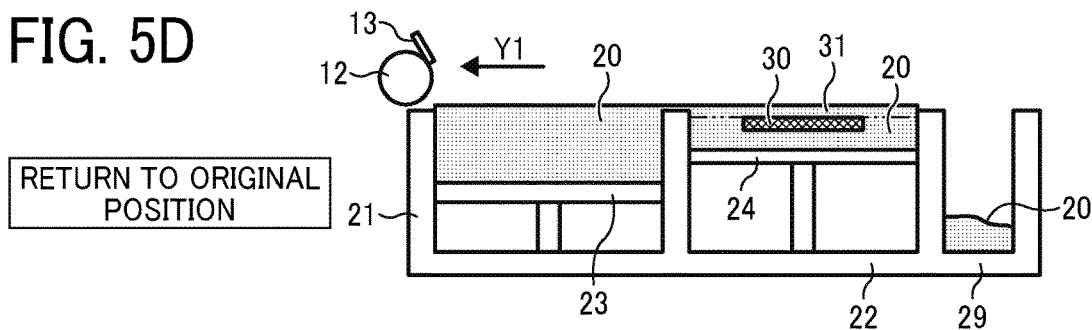

After forming the powder layer 31, as illustrated in FIG. 5D, the flattening roller 12 is moved in the Y1 direction and returned to the initial (original) position.

The flattening roller 12 is set to move while keeping the distance between the flattening roller 12 and the upper surface level of both of the fabrication tank 22 and the supplying tank 21 constant. As the flattening roller 12 moves with this distance constant, the powder layer 31 having the uniform thickness Δt1 can be formed on the fabrication tank 22 or the already-formed fabrication layer 30 while the flattening roller 12 conveys the powder 20 onto the fabrication tank 22.

Figure 5E:
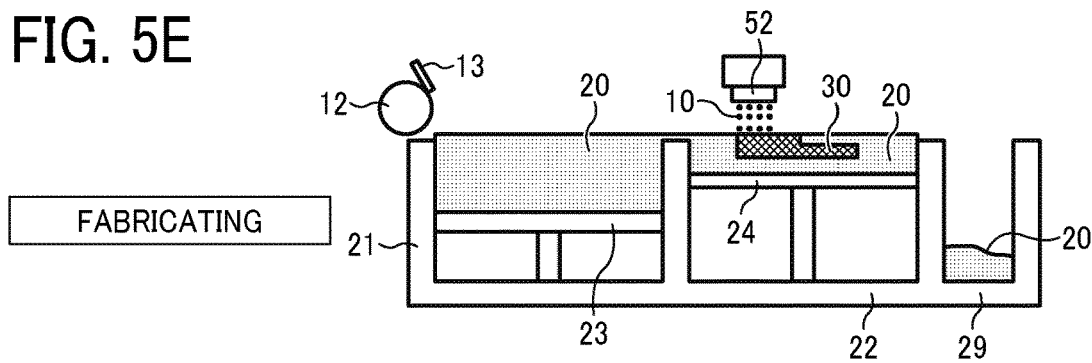

Thereafter, as illustrated in FIG. 5E, the liquid droplets of the liquid fabrication 10 from the head 52 of the liquid discharging unit 50 to additive-manufacture the fabrication layer 30 having a target form on the powder layer 31.

The fabrication layer 30 is formed by, for example, mixing the powder 20 with the liquid fabrication 10 discharged from the head 52 to the powder 20 so that the adhesive contained in the powder 20 is dissolved to bond the dissolved adhesive with each other to bond the powder 20.

Next, the step of forming the powder layer 31 by the powder supply and flattening described above and the step of the liquid fabrication discharging by the head 52 are repeated to form a new fabrication layer 30. At this point, the newly formed fabricated layer 30 and the fabrication layer 30 immediately therebelow are united to form a part of a solid object (three-dimensional object).

Thereafter, the solid object is completed by repeating the step of forming the powder layer 31 by powder supply and flattening and the step of discharging the liquid fabrication by the head 52 are repeated a required number of times.

Next, the powder (the solid freeform fabrication powder material) and the liquid fabrication are described.

The solid freeform fabrication powder material includes a base material and a cross-linkable water-soluble organic material (binder) which covers the base material with an average thickness of 5 to 500 nm. The binder is dissolved in water containing a cross-linking agent as the liquid fabrication.

In this solid freeform fabrication powder material, since the water-soluble organic material covering the base material is dissolvable in the water containing a cross-linking agent and linkable, when the water containing a cross-linking agent is applied to the water-soluble organic material, the water-soluble organic material is dissolved and cross-linked due to the cross-linking agent contained in the water containing a cross-linking agent.

Therefore, when a thin layer (the powder layer 31) is formed using the solid freeform powder material and the water containing a cross-linking agent as the liquid fabrication is discharged to the powder layer, the dissolved water-soluble organic material in the powder layer 31 is cross-linked. As a result, the powder layer 31 is bonded and cured to form the fabrication layer 30.

Next, the impact of the humidity in a fabrication environment on the quality of a solid freeform fabrication object is described with reference to FIGS. 6 and 7.

The powder 20 is an agglomeration of powder, particles (simply referred to as particle and represented by particle 20a).

Figure 6A:
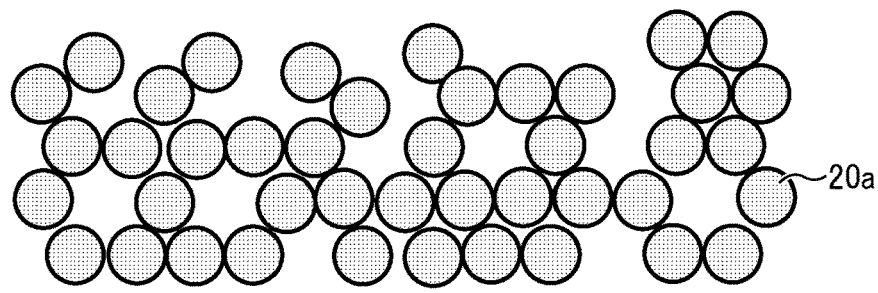
FIGS. 6A to 6C are diagrams illustrating impacts on the quality of a solid freeform fabrication object when the solid freeform fabrication object is fabricated in a high humidity environment.

If the humidity in a fabrication environment is high, as illustrated in FIG. 6A, the powder 20 contains a large amount of moisture, so that flowability of the particle 20a deteriorates, resulting in a decrease of packing density.

Figure 6B:
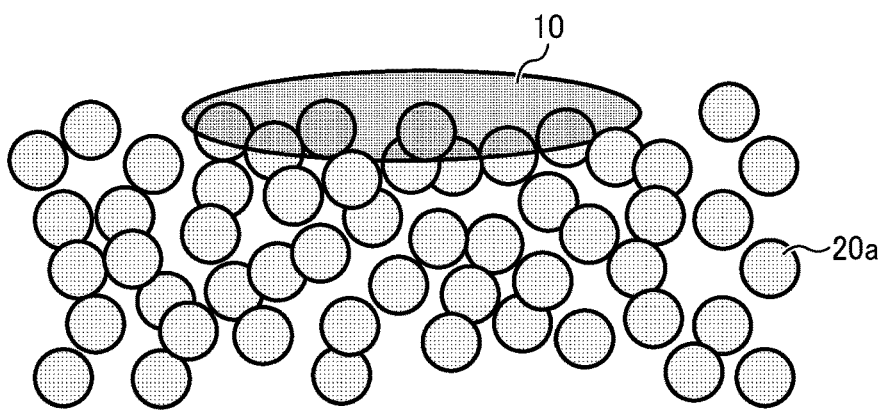

In such a high humidity environment, as illustrated in FIG. 6B, the packing density is low, so that the liquid fabrication 10 easily permeates inside the powder layer 31. This is because, as the packing density decreases, capillary force weakens so that the liquid fabrication 10 is considered to permeate in the surface direction more than the height direction.

Figure 6C:
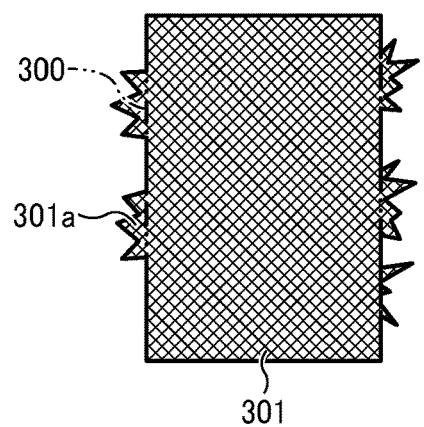

As a consequence, as illustrated in FIG. 6C, a solid freeform fabrication object 301 tends to include protruding portions 301a protruding from an original fabrication area 300 regulated by the fabrication data.

Figure 7A:
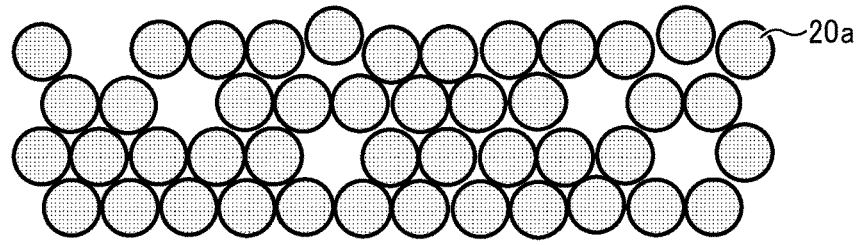
FIGS. 7A to 7C are diagrams illustrating impacts on the quality of a solid freeform fabrication object when the solid freeform fabrication object is fabricated in a low humidity environment.
Figure 7B:
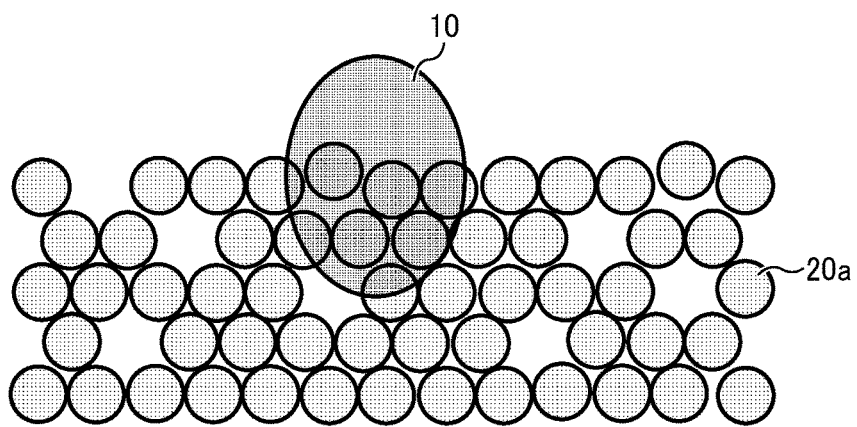

On the other hand, if the humidity in a fabrication environment is low, as illustrated in FIG. 7A, the powder 20 contains a small amount of moisture, so that flowability of the particle 20a is good, resulting in an increase of packing density.

In such a low humidity environment, since the packing density is high, the liquid fabrication 10 easily permeates in the thickness (height) direction of the powder layer 31. This is because, as the packing density increases, capillary force is enhanced so that the liquid fabrication 10 is considered to permeate in the height direction more than the surface direction.

Figure 7C:
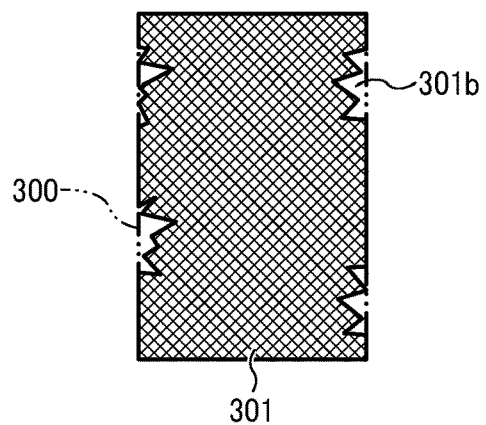

As a consequence, as illustrated in FIG. 7C, the solid freeform fabrication object 301 tends to include dented portions 301b dented from the original fabrication area 300 regulated by the fabrication data.

The fabrication quality is not stable depending on the environment humidity.

In the present disclosure, at least one of the recoat condition (flattening condition), the lamination pitch, and the application amount of liquid fabrication (droplet) is set to be changed depending on the environment humidity.

Recoat Condition: Recoat Speed

In a low humidity environment, the moving speed (recoat speed) of the flattening roller 12 is increased. In the case of a low humidity environment, flowability of powder increases. Therefore, the recoat speed is increased to prevent scattering of the powder 20.

In a high humidity environment, the recoat speed is reduced. In the case of a high humidity environment, flowability of powder deteriorates so that the powder easily agglomerates. Therefore, by reducing the recoat speed, the aggregated powder 20 is pulverized by the flattening roller 12 to form the powder layer 31 while packing.

Recoat Condition: Number of Rotation of Recoater

In a low humidity environment, the number of rotation of the flattening roller 12 is decreased. In the case of a low humidity environment, flowability of powder increases. Therefore, the number of rotation is increased to prevent scattering of the powder 20.

In a high humidity environment, the number of rotation of the flattening roller 12 is increased. In the case of a high humidity environment, flowability of powder deteriorates so that the powder easily agglomerates. Therefore, by reducing the number of rotation, the aggregated powder 20 is pulverized by the flattening roller 12 to form the powder layer 31 while packing.

Lamination Pitch

In a low humidity environment, the lamination pitch is increased (increase the thickness). In the case of a low humidity environment, since the liquid fabrication easily permeates into the Z direction (height direction: thickness direction) due to the capillary force, the lamination pitch is increased to increase the application amount of the liquid fabrication to compensate the deterioration of permeation in the X and Y directions (surface direction).

In a high humidity environment, the lamination pitch is decreased (decrease the thickness). In the case of a high humidity, the number of hydrophilic groups on the surface of the particle 20a of the powder 20 increases so that the liquid fabrication easily permeates into the X and Y directions. To compensate deterioration of permeation in the Z direction, the lamination pitch is decreased.

Application Amount of Liquid Fabrication

In a low humidity environment, the application amount of the liquid fabrication 10 is increased. In the case of a low humidity environment, since the liquid fabrication easily permeates into the Z direction (height direction) due to the capillary force, the application amount is increased to permeate the liquid fabrication all over in the X direction and the Y direction.

In a high humidity environment, the application amount of the liquid fabrication 10 is decreased. In the case of a high humidity, the number of hydrophilic groups on the surface of the particle 20a of the powder 20 increases so that the liquid fabrication easily permeates into the X and Y directions. To improve the dimension accuracy in the X and Y directions, the application amount is decreased.

As described above, the fabrication quality can be stabilized by controlling the change of at least one of the moving speed of the flattening device, the number of rotation of the flattening device, the lamination pitch, and the application amount of liquid fabrication.

Figure 8:
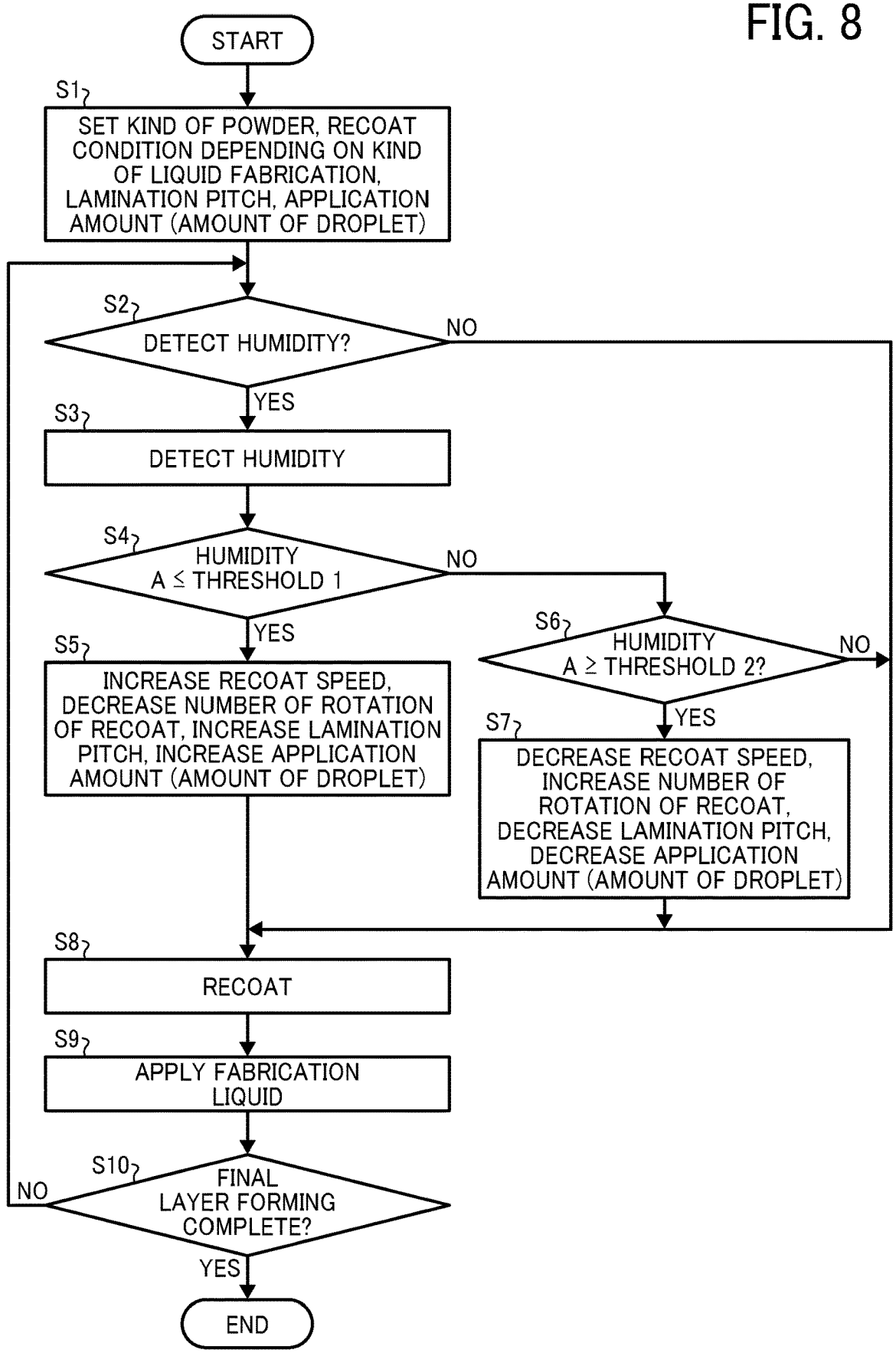
FIG. 8 is a diagram illustrating a flow chart of the control of solid freeform fabrication operation in a first embodiment of the present disclosure.

Next, the control of the solid freeform fabrication in the first embodiment of the present disclosure is described with reference to the flow chart of FIG. 8.

In the first embodiment, when the detected humidity A is equal to or lower than the preliminarily determined threshold 1, the detected humidity A is determined as low humidity. when the detected humidity A is equal to or higher than a preliminarily determined threshold 2 (greater than the threshold 1), the detected humidity A is determined as high humidity. Based on this, the recoat condition, the lamination pitch, and the application amount of the liquid fabrication described above are changed or adjusted. When the detected humidity is within the threshold 1 and threshold 2, the recoat condition, the lamination pitch, and the application amount of the liquid fabrication regulated depending on the kind of the powder 20 and the kind of the liquid fabrication 10 are used as they are, which are referred to as initial set values.

That is, first, the recoat condition (flattening condition), the lamination pitch $\Delta t1$, and the application amount (droplet amount) of the liquid fabrication 10 are set depending on the kind of the powder 20 and the kind of the liquid fabrication 10 (Step 1).

Whether to detect humidity is determined (Step 2). If determined to detect (Yes to Step 2), the humidity is detected (Step 3). If determined not to detect (No to Step 2), the powder layer 31 is formed by the flattening (recoating) (Step 8).

Whether to detect humidity is conducted every time the powder layer 31 is formed. It may be conducted per predetermined timing (time interval). The powder is sweating in about ten minutes and becomes equilibrium with the moisture in the environment in about 120 minutes. Therefore, it is preferable to detect humidity with a predetermined time interval.

Thereafter, whether the detected humidity A is equal to or less than the threshold 1 (for example, 25 percent RH) is determined (Step 4).

When the humidity A is equal to or less than the threshold 1 (Yes to Step 4), the moving speed (recoat speed) of the flattening roller 12 is increased, the number of rotation (number of recoater rotation) is decreased, the lamination pitch is increased, and the application amount is increased in comparison with the initially set value (Step 5).

When the humidity A is greater than the threshold 1 (No to Step 4), whether the detected humidity A is equal to or less than the threshold 2 (for example, 70 percent RH) (threshold 2>threshold 1) is determined (Step 6). When the humidity A is equal to or greater than the threshold 2 (Yes to Step 6), the moving speed (recoat speed) of the flattening roller 12 is increased, the lamination pitch is decreased, and the application amount is decreased in comparison with the initial set value.

Thereafter, the powder layer 31 is formed by the flattening (recoating) (Step 8) and the liquid fabrication 10 is applied to the powder layer 31 (Step 9) to fabricate the fabrication layer 30.

The processing described above is repeated (No to Step 10) until fabrication is complete to the last layer (Step 10). When completed (Yes to Step 10), this processing is finished.

Figure 9:
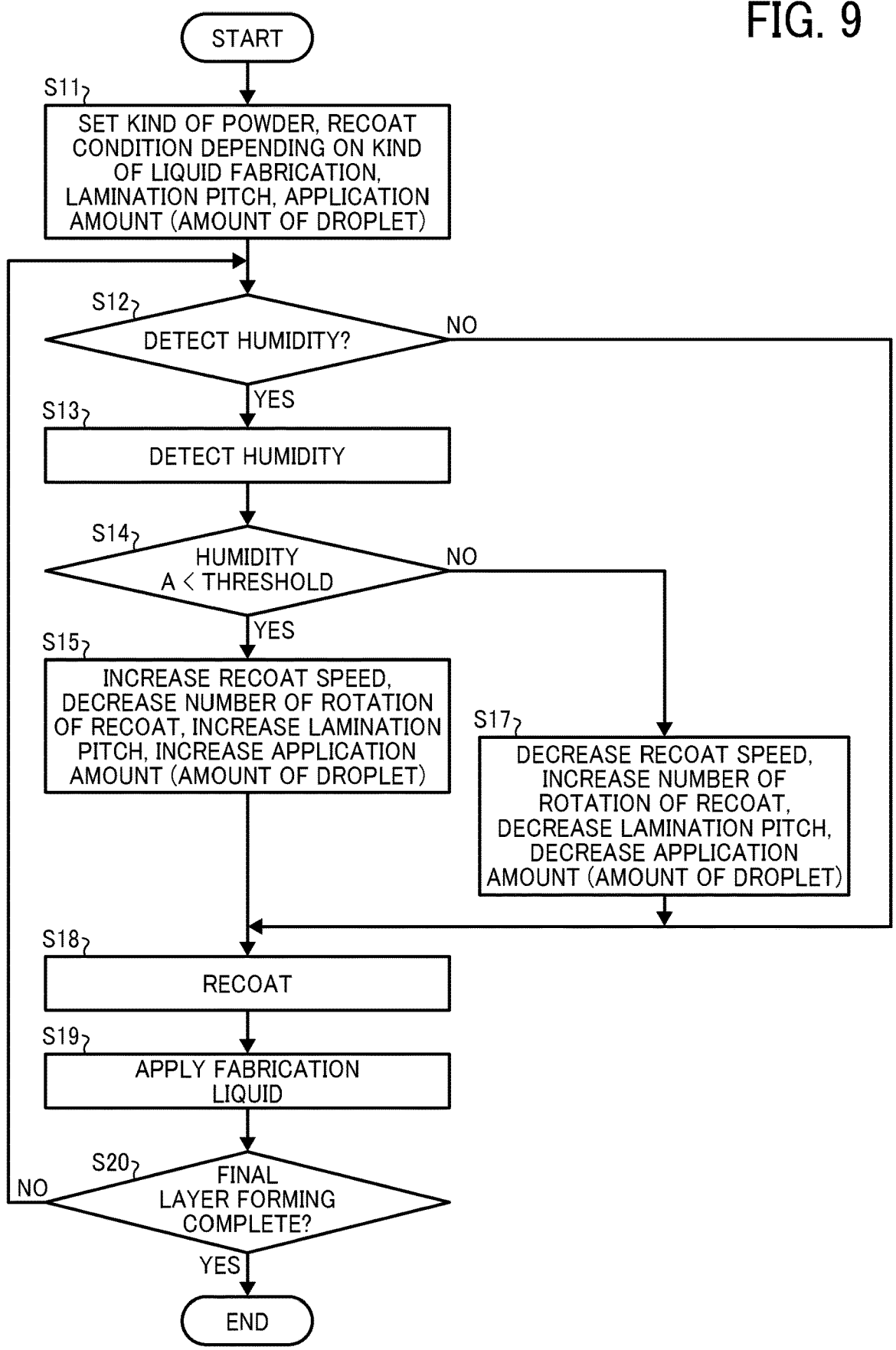
FIG. 9 is a diagram illustrating a flow chart of control of solid freeform fabrication operation in a second embodiment of the present disclosure.

Next, control of the fabrication operation of the second embodiment of the present disclosure is described with reference to the flow chart of FIG. 9.

In the second embodiment, when the detected humidity A is less than a preliminarily determined threshold (for example, 50 percent RH), the detected humidity A is determined as low humidity. When the detected humidity A is equal to or higher than the preliminarily determined threshold, the detected humidity A is determined as high humidity. Based on this, the recoat condition, the lamination pitch, and the application amount of the liquid fabrication described above are changed or adjusted.

That is, first, the recoat condition (flattening condition), the lamination pitch $\Delta t1$, and the application amount (droplet amount) of the liquid fabrication 10 are set depending on the kind of the powder 20 and the kind of the liquid fabrication 10 (Step 1).

Whether to detect humidity is determined (Step 12). If determined to detect (Y to Step 12), the humidity is detected (Step 13).

Thereafter, whether the detected humidity A is less than the threshold is determined (Step 14).

When the moisture A is less than the threshold, the moving speed (recoat speed) of the flattening roller (recoater) 12 is increased, the number of rotation (number of rotation of the flattening roller 12) is decreased, the lamination pitch Δt1 is increased, and the application amount is increased in comparison with the initially set value (Step 15).

When the humidity A is equal to or greater than the threshold (No to Step 15), the moving speed (recoat speed) of the flattening roller 12 is increased, the lamination pitch Δt1 is decreased, and the application amount is increased in comparison with the initially set value (Step 17).

Thereafter, the powder layer 31 is formed by the flattening (recoating) (Step 18) and the liquid fabrication 10 is applied to the powder layer 31 (Step 19) to fabricate the fabrication layer 30.

The processing described above is repeated (No to Step 20) until fabrication is complete to the last layer (Step 20). When completed (Yes to step 20), this processing is finished.

It is also possible to change the changing amount from the initially set values of the recoat condition, the lamination pitch, the application amount of the fabrication liquid depending on the deviation amount of the detected humidity and the threshold.

If the measuring (detected) results of humidity is recorded from the power-on of a device, the state of the powder can be evaluated using more information. In addition, by recording the results of measured humidity in the fabricating device at stand-by for fabrication operation, it is possible to evaluate the state of the powder from when the device comes back from the stand-by using more information.

In the embodiments described above, the solid freeform fabrication device having a two-tank structure of the supply tank and the fabrication tank is used but the structure of the solid freeform fabrication device is not limited thereto. For example, the present disclosure can be applied to a solid freeform fabrication device having a single tank configuration of a fabrication tank to which powder is directly supplied followed by flattening the powder by a flattening device such as a blade and a roller.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device to fabricate a solid freeform fabrication object, comprising:
a flattening device configured to lay powder to form a powder layer and flatten a surface of the powder layer;
a liquid fabrication application device configured to apply a liquid fabrication to the powder layer to fabricate a layer object;
a fabrication controller configured to control fabrication of the solid freeform fabrication object by repeating laying the powder to form a powder layer, flattening the surface of the powder layer, and applying the liquid fabrication to the powder layer to laminate the layer object to fabricate the solid freeform fabrication object, and;
a detector configured to detect humidity,
wherein the fabrication controller is further configured to change at least one of a moving speed of the flattening device and a number of rotations of the flattening device, according to the humidity detected by the detector.

2. The device according to claim 1, wherein a flattening condition is determined depending on at least one of a kind of the powder and a kind of the liquid fabrication.

3. The device according to claim 1, wherein the humidity is detected per predetermined time interval.

4. The device according to claim 1, wherein the fabrication controller is further configured to change an application amount of the liquid fabrication according to the humidity detected by the detector.

5. The device according to claim 1, wherein the fabrication controller is further configured to perform at least one of (i) increasing a moving speed of the flattening device and (ii) decreasing a number of rotation of the flattening device in comparison with an initially set value when the humidity detected by the detector is equal to or lower than a first threshold.

6. The device according to claim 5, wherein the fabrication controller is further configured to perform at least one of (i) decreasing the moving speed of the flattening device and (ii) increasing the number of rotation of the flattening device in comparison with the initially set value when the humidity detected by the detector is equal to or higher than a second threshold.

7. The device according to claim 6, wherein the fabrication controller is further configured to drive the flattening device according to the initially set value when the humidity detected by the detector is within a range between the first threshold and the second threshold.

* * * * *